United States Patent
McNelis (10) Patent No.: US 6,563,763 B2
(45) Date of Patent: May 13, 2003

(54) METHOD AND SYSTEM FOR CORRECTING FOR CURVATURE IN DETERMINING THE TRAJECTORY OF A PROJECTILE

(75) Inventor: Niall B. McNelis, Timonium, MD (US)

(73) Assignee: AAI Corporation, Hunt Valley, MD (US)

( * ) Notice: Subject to any disclaimer, the term of this patent is extended or adjusted under 35 U.S.C. 154(b) by 0 days.

(21) Appl. No.: 10/113,932

(22) Filed: Apr. 2, 2002

(65) Prior Publication Data

US 2002/0139895 A1 Oct. 3, 2002

Related U.S. Application Data (60) Provisional application No. 60/280,740, filed on Apr. 3, 2001.

(51) Int. Cl.$^7$ .................................................. G01S 5/18
(52) U.S. Cl. ........................ 367/127; 367/124; 367/129; 367/906
(58) Field of Search ........................ 342/59, 175, 195; 244/3.1–3.3; 273/348, 371, 372; 367/118–130, 906; 434/11–27

(56) References Cited

U.S. PATENT DOCUMENTS

| | | | |
|---|---|---|---|
| 4,323,993 A | 4/1982 | Soderblom et al. | |
| 4,351,026 A | 9/1982 | Philips | |
| 4,514,621 A | 4/1985 | Knight et al. | |
| 4,659,034 A | 4/1987 | Diekmann | |
| 4,805,159 A | 2/1989 | Negendank et al. | |
| 4,885,725 A | 12/1989 | McCarthy et al. | |
| 5,025,424 A | 6/1991 | Rohrbaugh | |
| 5,241,518 A | * 8/1993 | McNelis et al. | ............. 367/127 |
| 5,258,962 A | 11/1993 | Karlsen | |
| 5,544,129 A | 8/1996 | McNelis | |
| 5,781,505 A | 7/1998 | Rowland | |
| 5,920,522 A | * 7/1999 | Levanon | ...................... 367/129 |
| 5,930,202 A | 7/1999 | Duckworth et al. | |
| 6,178,141 B1 | * 1/2001 | Duckworth et al. | ......... 367/127 |

FOREIGN PATENT DOCUMENTS

| | | | | |
|---|---|---|---|---|
| DE | 2743477 A1 | * | 3/1978 | ............. F41J/5/12 |
| DE | 3341549 A1 | * | 5/1985 | ............. F41J/9/10 |
| DE | 3524753 A1 | | 7/1985 | |
| DE | 4106040 A1 | * | 8/1992 | ............. G01P/5/18 |
| EP | 0019428 A1 | * | 11/1980 | ............. G01S/3/80 |
| EP | 064477 A1 | | 4/1982 | |
| EP | 068485 A2 | | 6/1982 | |
| EP | 0342201 B1 | * | 11/1989 | ............. G01P/3/68 |
| EP | 0455531 A1 | * | 11/1991 | ............. F41G/7/22 |
| FR | 2692031 A1 | * | 12/1993 | ............. F41H/5/12 |
| GB | 259428 A | | 10/1926 | |
| GB | 2105464 A | | 9/1981 | |
| GB | 2181240 A | | 4/1987 | |
| WO | WO91/10876 A1 | | 7/1991 | |
| WO | WO-00/73811 A1 | * | 12/2000 | ............. G01S/3/80 |

* cited by examiner

*Primary Examiner*—Bernarr E. Gregory
(74) *Attorney, Agent, or Firm*—Venable; John P. Shannon; Jeffri A. Kaminski (57) ABSTRACT

Given a trajectory and unit pointing vectors determined based on a planar or other approximation of a shock wave, a method and apparatus are provided to calculate times the sensors should have detected, based on a conical geometry of the shock wave. A difference between the calculated times and the actual times measured by the sensors may be minimized. The minimization may be performed by perturbing the unit vectors. When the perturbation of the unit vectors results in an acceptable difference between the calculated times and the measured times, an accurate trajectory of the projectile can be generated from the perturbed unit pointing vectors.

21 Claims, 8 Drawing Sheets

METHOD AND SYSTEM FOR CORRECTING FOR CURVATURE IN DETERMINING THE TRAJECTORY OF A PROJECTILE

This application the benefit of provisional application No. 60/280,740 filed on Apr. 3, 2001.

BACKGROUND OF THE INVENTION

The art has long recognized that acoustical means may be used for determining a portion of the trajectory of a projectile, and the art, generally, has used such acoustical means for locating the point at which a projectile passes into or near a training target for scoring the accuracy of small arms fire, in lieu of the more conventional paper targets. An example of the foregoing is U.S. Pat. No. 4,514,621. Basically, these devices operate by means of a grid of acoustical sensors in which the plane of the sensors is normal to the trajectory of the projectile, e.g. a rifle bullet. As the bullet passes through that grid of sensors, the sensors can locate the passage of the bullet through that grid of sensors by calculating the time delays of the sensors.

Rather than using a grid of acoustical sensors to determine the trajectory of the projectile, curved elongated hoops with acoustical transducers at ends thereof may be used. When a bullet passes within the vicinity of the curved hoops, the position of the bullet passing such curved hoops can be calculated, and U.S. Pat. No. 4,351,026 is representative thereof. Curved hoops may also be used where the target is moving within a defined field normal to the hoops, and U.S. Pat. No. 5,025,424 is representative of that technology.

Somewhat similarly, U.S. Pat. No. 4,885,725 suggests a plurality of triangularly arrayed, mechanically connected acoustical transducers, instead of curved hoops, for determining the point in which a bullet passes the target area and for providing some indication of the velocity of that bullet.

The foregoing patents are, primarily, directed toward training devices for scoring the accuracy of a trainee's fire. Some patents have addressed determining the general direction of enemy fire toward a military device, such as a helicopter. For example, U.S. Pat. No. 4,659,034 suggests the use of a plurality of transducers disposed on a movable (towed) target and, by use of the transducers, determining the accuracy of fire toward that target. That accuracy of fire includes how close the projectile comes to the towed target (referred to as the miss-distance). U.S. Pat. No. 4,323,993 similarly determines a miss-distance by acoustical transducers, and, particularly, in this patent the miss-distance is calculable even though the projectile misses the towed target altogether.

U.S. Pat. No. 4,805,159 provides a method for estimating the miss-distance between a projectile and a movable training target. In making such estimation, at least a portion of the trajectory of the projectile is also estimated. However, as that patent points out, the estimations of at least a portion of the trajectory of the projectile involves a number of possible estimates of the actual projectile path, and to eliminate erroneous estimates, additional transducers are used for consecutively selecting true estimates from erroneous estimates.

In further developments, U.S. Pat. Nos. 5,544,129, DE 3524753A1, GB 2105464, GB 2181240, and GB 2246861 deal with the detection of acoustic phenomenon for the detection of gunfire. These patents deal with the detection of the muzzle blast wave rather than the projectile shock wave to determine the trajectory of the projectile, such as a bullet. The approximation of a planar wave for the blast wave is made for timing detection.

U.S. Pat. No. 5,930,202 teaches a basic system of two sensors each with at least 3 sensing elements each for trajectory determination. The system senses the shock wave of the projectile. This system has a very large base length (spacing between sensors). As a result, the projectile is assumed to travel parallel to the ground. Consequently, the system is not able to distinguish elevation unless an additional muzzle blast is sensed.

Thus, in general, the prior art, mainly, uses sensors, especially acoustical transducers, in various spatial arrangements for determining the miss-distance of a projectile passing through or near a target. Some of these systems in the art may provide a general direction of a local trajectory of the projectile, but these systems are not capable of providing accurate information as to the entire path of the projectile, and, hence, the position of the source of that projectile. In addition, these prior art systems, whatever their configuration, must have pre-knowledge of the direction and/or the velocity of the projectile, in order to determine the local trajectory of the projectile.

Recently, several attempts have been made to provide a full solution to determining the trajectory of a projectile. For example, U.S. Pat. Nos. 5,258,962, 5,241,518, 4,885,725 and 4,323,993; and foreign patents EP 0,259,428, EP 0064477A, EP 0684485 and WO 91/108876 all provide a full solution by assuming that the portion of the conical shock wave striking a sensor is planar in shape. This leads to an error in the derivation of the direction of arrival of the projectile that becomes more severe as the trajectory miss distance decreases, as is described in more detail below.

As a supersonic projectile passes through the air along its trajectory, it creates a conical shock wave. The conical shock wave extends outward from the bow or tip of the projectile. As the shock wave expands out from the projectile's trajectory, it encounters the sensors. In order to locate the trajectory in three-dimensional space, relevant acoustic systems all make the same fundamental assumption; they assume that the sensing elements within each sensor are spaced close to each other compared to the distance between the sensor and the trajectory. This allows the subsequent assumption that the segment of the shock wave hitting an individual sensor (and its associated elements) is a flat planar wave. As the trajectory has a smaller miss distance to a sensor, this planar assumption leads to an increasing error in the trajectory location and orientation determination. If the sensor is part of a target system, this will lead to increased target hitpoint errors. This error arises because the actual segment of the shock cone striking the sensor is curved. This discrepancy between the flat and curved shock wave shapes leads to the generation of a unit pointing vector that is misaligned from the true unit pointing vector. This, in turn, causes a misalignment of the deduced trajectory and any projected hitpoint.

Accordingly, it is currently the general practice to assume a planar shock wave strikes the sensor. The normal to that assumed plane can then calculated from the arrival time differences at the sensor elements. This works well when the approximation to the shock wave segment is closer to a plane in shape than to a cone. This, therefore, is a good approximation when the shock source (trajectory) is far from the sensor. But as greater accuracy is required, it is necessary to eliminate this planar approximation and calculate from the exact conical geometry of the shock wave, regardless of any other errors.

Therefore, there is a need to remove the above described errors created by the planar approximation of the shock wave. Furthermore, there is a need to achieve a best fit to all sensor data; thus, minimizing intrinsic timing, mechanical alignment and mechanical construction errors (non-curvature based errors).

SUMMARY OF THE INVENTION

The present invention can provide a method and apparatus for determining the trajectory of a projectile. As the projectile moves through the air, a pressure wave is created. The pressure wave is detected and various parameters can be determined based on this detection. An incorrect trajectory can be determined from these parameters using a planar approximation for the pressure wave. In an exemplary embodiment of the invention, the correct trajectory of the projectile can be generated based on the incorrect trajectory and the measured parameters. Unit pointing vectors used to generate the incorrect trajectory can be perturbed to minimize a difference between the parameters actually measured and parameters calculated using a correct geometry for the pressure wave and the incorrect trajectory. As the difference between the measured parameters and the calculated parameters falls within an acceptable range, a more accurate trajectory for the projectile can be determined.

Given a trajectory and unit pointing vectors determined based on a planar or other approximation of a shock wave, a method and apparatus according to an embodiment of the invention may calculate parameters, such as times, the sensors should have detected, based on this trajectory and a conical geometry for the shock wave. A difference between the calculated times and the actual times measured by the sensors may be minimized. The minimization may be performed by perturbing the unit pointing vectors. When the perturbation of the unit pointing vectors results in an acceptable difference between the calculated times and the measured times, an accurate trajectory of the projectile can be generated from the perturbed unit pointing vectors.

In an exemplary embodiment, an apparatus for determining a trajectory of a projectile comprises at least two spaced apart sensors capable of encountering a pressure wave generated by a projectile and capable of generating signals in response to the pressure wave, the signals being related to a unit pointing vector. Means for calculating the unit pointing vectors for each of the sensors from the signals may also be provided. Means for calculating a first trajectory of the projectile based on the unit pointing vectors and means for back-calculating times from the first trajectory based on a conical geometry of the pressure wave may also be provided.

According to another embodiment, a method for determining the trajectory of a projectile comprises detecting a shock wave created by the projectile with a number of sensors. Times at which the sensors encounter the shock wave may be measured. Unit pointing vectors can be generated based on the measured times. A first trajectory for the projectile can be determined based on the unit pointing vectors. At least one of the unit pointing vectors may be perturbed. A second trajectory can be generated based on the perturbed unit pointing vector and the remaining unit pointing vectors. Calculated times may be determined based on the second trajectory. A difference between the measured times and the calculated times can be determined. If the difference is outside an acceptable range, the process may be repeated. Otherwise a source of the projectile may be located based on the second trajectory.

DETAILED DESCRIPTION OF THE INVENTION

The present invention can provide a method and apparatus to accurately determine a trajectory of a projectile. As discussed above, most methods for determining the trajectory assume a pressure wave generated by the projectile is planar in shape, when, in fact, the pressure wave is conical. The present invention corrects for this assumption and provides a curvature corrected solution for greater accuracy in determining the trajectory of the projectile.

As a supersonic projectile moves through the air, it typically generates a shock wave. The pressure wave can be detected and used to determine a trajectory of the projectile. Any method can be used to detect the pressure wave and determine an initial trajectory. For example, the trajectory can be determined based on a photometric density measurement technique, such as from a Schlieren photograph, or from parameters generated by acoustic transducers that sense the pressure wave. Based on the parameters generated by the detection method (measured parameters), unit pointing vectors can be determined. From these unit pointing vectors, it is a simple procedure to determine the trajectory of the projectile. However, since the pressure wave is actually conical in shape, this trajectory will be incorrect. Based on this incorrect trajectory, the parameters that should have been detected using a correct conical geometry for the pressure wave can be calculated (calculated parameters). The difference between the measured and calculated parameters can be used to determine a more accurate trajectory. For example, the unit pointing vectors may be perturbed to minimize the difference between the measured parameters and the calculated parameters. When this difference is within an acceptable range, an accurate trajectory for the projectile can be determined based on the perturbed unit vectors.

The invention is described in more detail below in the context of acoustic transducers that record times that the pressure wave encounters the transducers. These times are then used to determine the trajectory of the projectile. However, as discussed above, any way of detecting pressure wave and any parameter obtained from the detection can be used in conjunction with the present invention.

Usually in methods and apparatus for determining the trajectory of a supersonic projectile, sensors of some type are used to detect the shock wave created by the projectile. Based on the detection of the shock wave, various parameters regarding the shock wave can be collected or measured, for example, the times different sensors encounter the shock wave. These measured parameters may then be used to derive information regarding the trajectory of the projectile. Typically, unit pointing vectors are determined from the parameters. The unit pointing vectors can be used to determine an elevation and azimuth towards a trajectory of the projectile. Based on these unit pointing vectors, the trajectory of the projectile can be obtained. There are several well-know ways to determine the trajectory from the unit pointing vectors. As described above, these operations to determine the trajectory are usually performed assuming the shock wave is planar or some shape other than the actual conical shape in order to simplify the calculations. The present invention may utilize the measured parameters of the shock wave and the unit pointing vectors determined therefrom to correct for the curvature of the shock wave, as described below.

Typically, sensors record times when the shock wave is encountered by that particular sensor. A trajectory and unit pointing vectors may be generated from these times based on a planar approximation of the shock wave. Since the shock wave actually has a conical geometry, this trajectory is incorrect. Given this incorrect trajectory and unit pointing vectors, a method and apparatus according to an embodiment of the invention may calculate times the sensors should have detected, based on a conical geometry of the shock wave for the incorrect trajectory. A difference between the times calculated from the incorrect trajectory and the actual times measured by the sensors may be minimized. This minimization may be performed by perturbing the unit vectors. When the perturbation of the unit vectors results in an acceptable difference between the calculated times and the measured times, an accurate trajectory of the projectile can be generated from the perturbed unit pointing vectors. Of course, if parameters other than time are used to generate the unit pointing vectors and trajectory, differences between the measured and calculated parameters may be minimized utilizing the present invention to correct for curvature of the shock wave.

Figure 1:
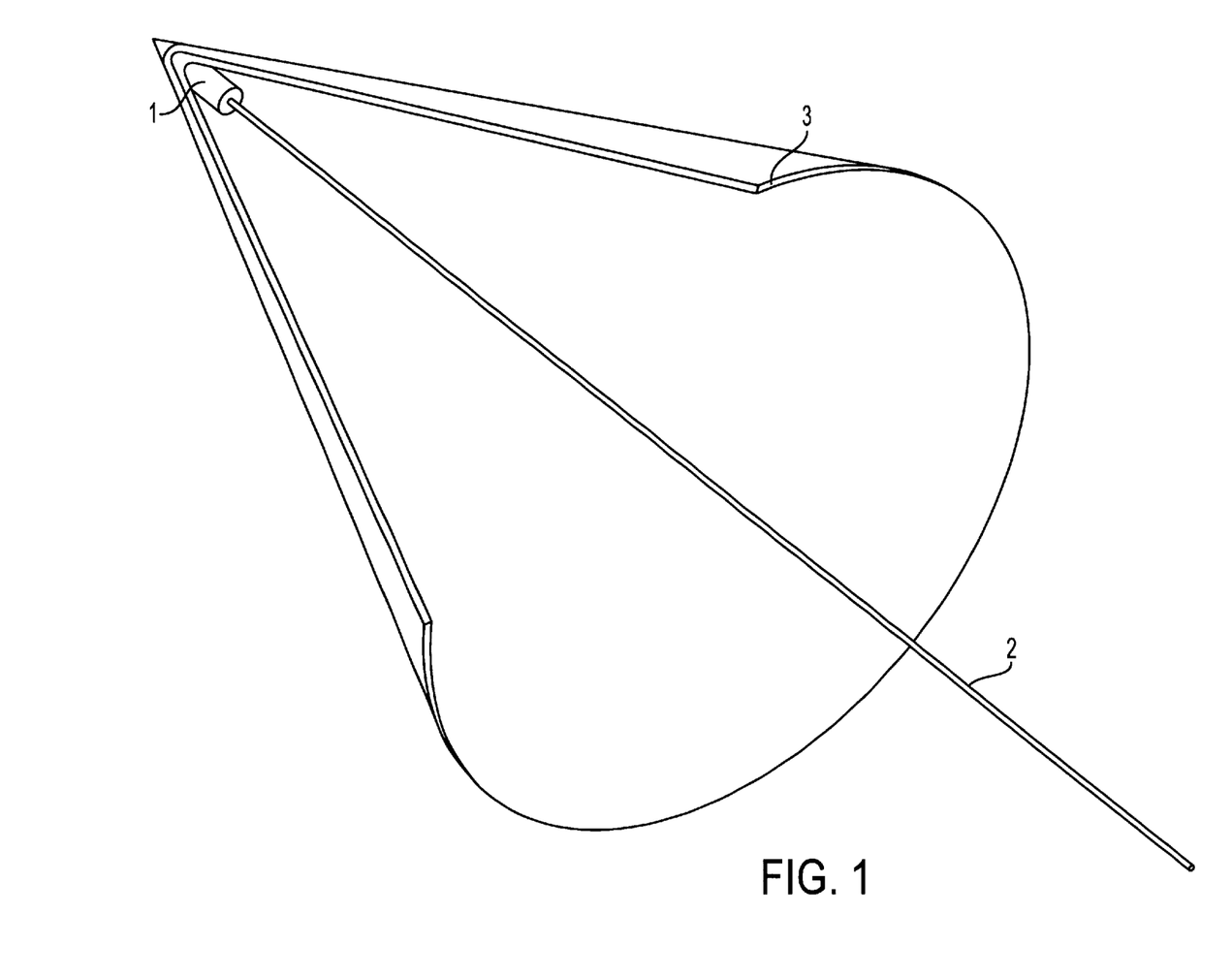
FIG. 1 illustrates a projectile passing through the air and its pressure wave.
Figure 2:
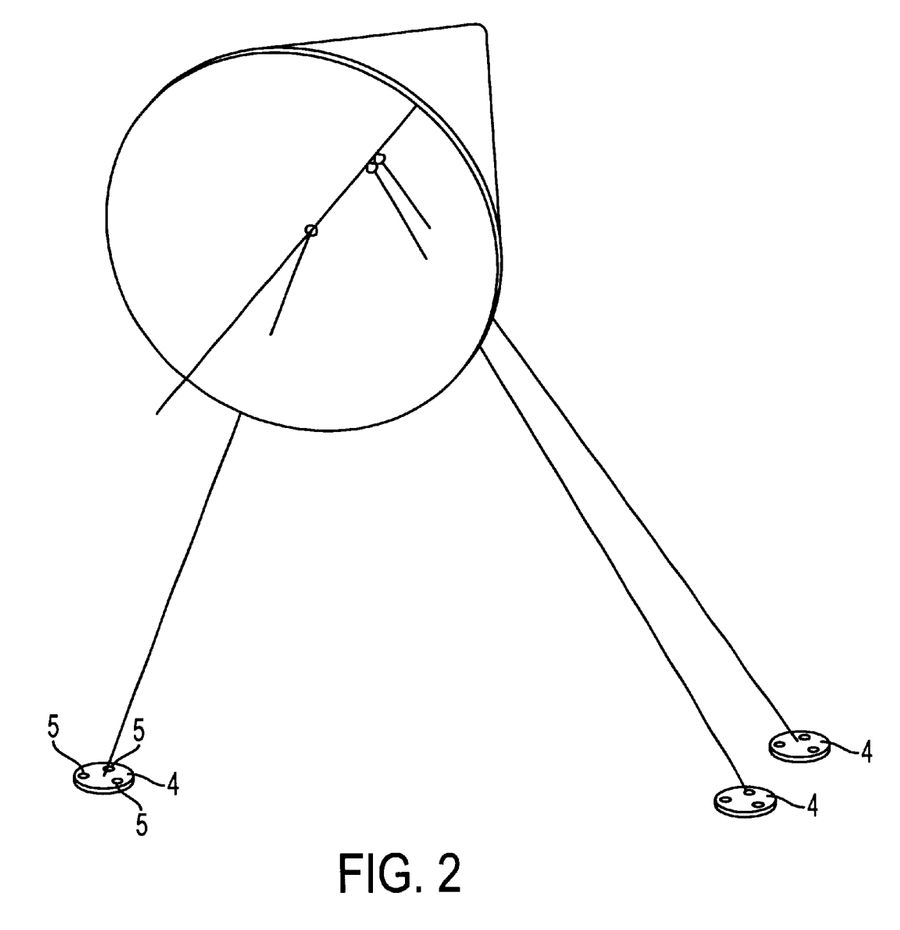
FIG. 2 illustrates a generic arrangement of sensors used to detect the pressure wave.
Figure 3:
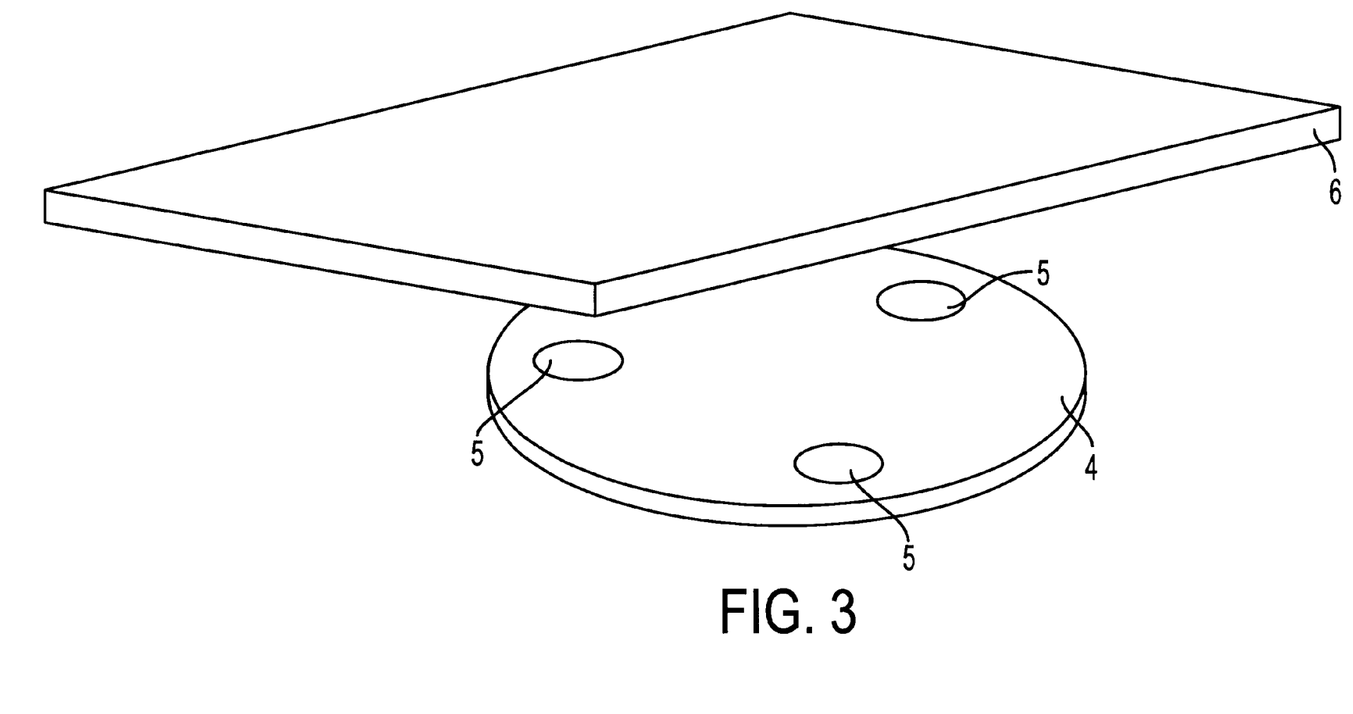
FIG. 3 illustrates a plane wave segment of a pressure wave arriving at a sensor.
Figure 4:
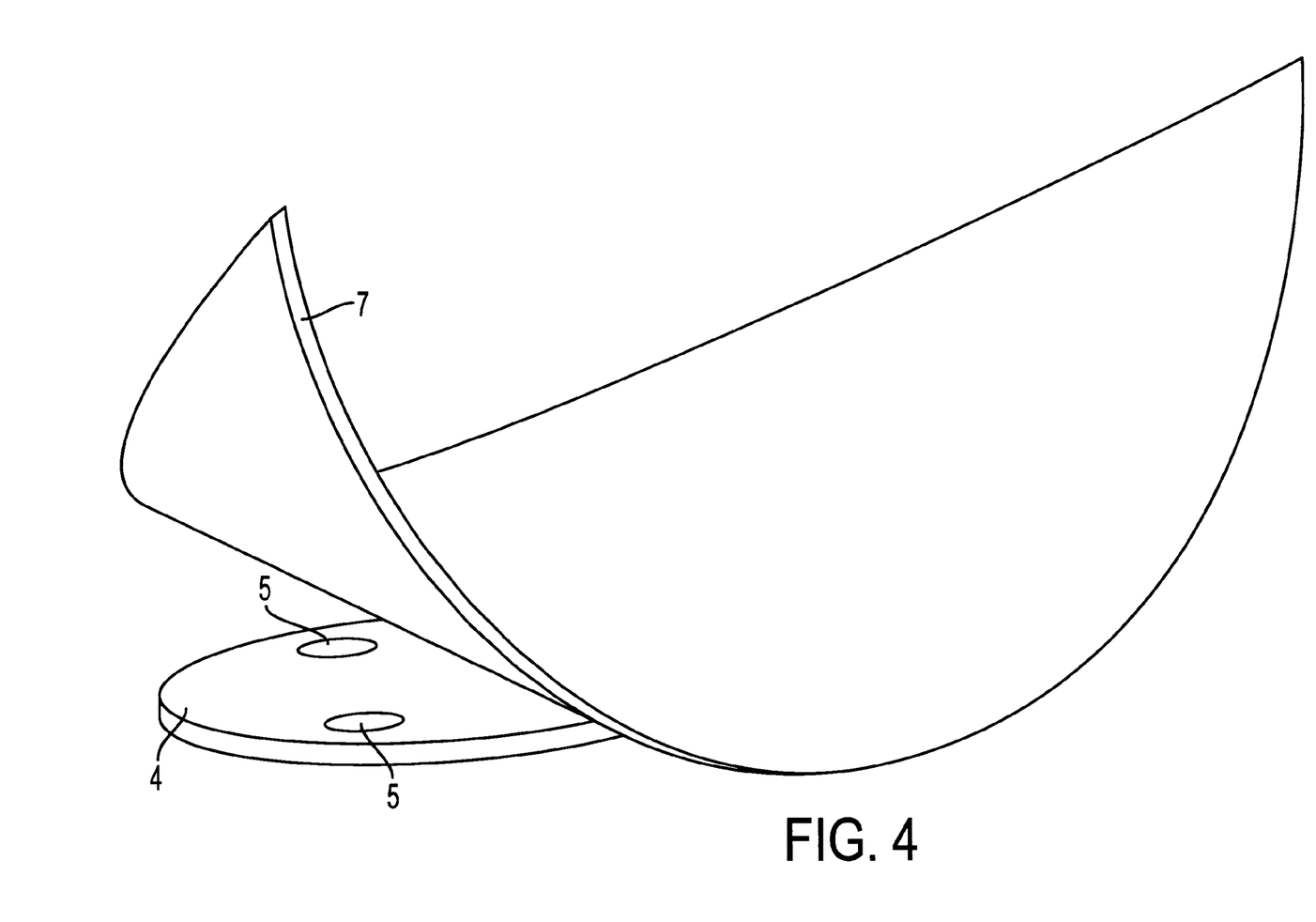
FIG. 4 illustrates a conical pressure wave arriving at a sensor.
Figure 5:
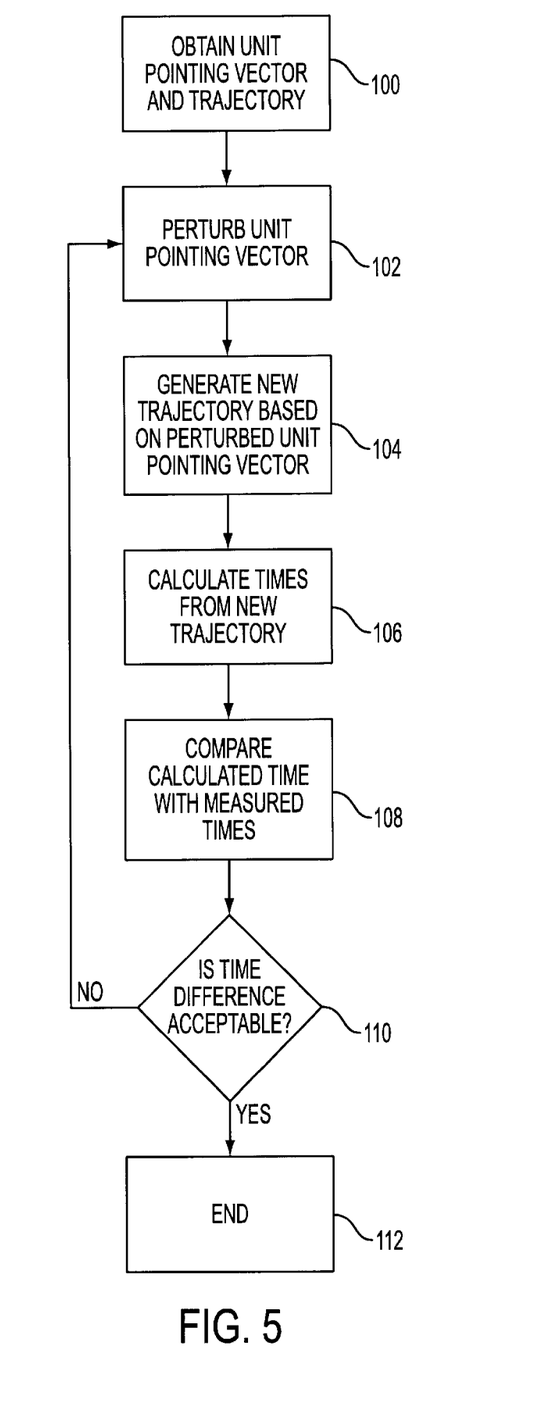
FIG. 5 is a flow diagram of a method according to an embodiment of the invention.

Referring now to FIG. 5, an overview of a method according to an exemplary embodiment of the invention is described. As mentioned above, the times the shock wave is encountered by the different sensors may be measured. Based on these measured times, a planar approximation to the shock wave normal vector can be generated for the sensors. These vectors are usually unit pointing vectors for each of the sensors. The unit pointing vectors may be used to generate a full solution for the projectile, that is, full pointing vectors, including magnitude, from the sensors to the trajectory for the projectile, per step 100. However, since this trajectory is typically generated using a planar approximation for the shock wave and the shock wave is actually conical, this trajectory is inaccurate. To compensate for the planar approximation, an iterative process can be performed.

Beginning in step 102, one of the unit pointing vectors obtained in step 100 may be perturbed. Preferably the perturbation is performed in two planes that are perpendicular to each other. Judicious selection of the planes can increase the speed in which an accurate result is reached. In particular, a fast convergence to the conical approximation can be achieved if the unit vector is first perturbed in a plane containing a gradient calculated from the previous iteration or, initially, the planar approximation. The unit vector is then perturbed in a plane perpendicular to the plane based on the gradient. Next in step 104, the unit pointing vector generated in step 102 and the other unit pointing vectors that are not being perturbed may be used to generate a new trajectory. The new trajectory from step 104 may then be used to back-calculate times the shock waves should have arrived at the sensors in step 106. The back calculation should be performed using a conical geometry for the shock wave. The back-calculated times can be compared to the measured times, per step 108. If the difference between the actual times and the back-calculated times is acceptable, the process may end, step 112. Otherwise the process should return to step 102 and repeat for other unit pointing vectors, per step 110. The process may be repeated for a predetermined number of iterations, a predetermined time period or until an acceptable result is obtained.

Figure 6:
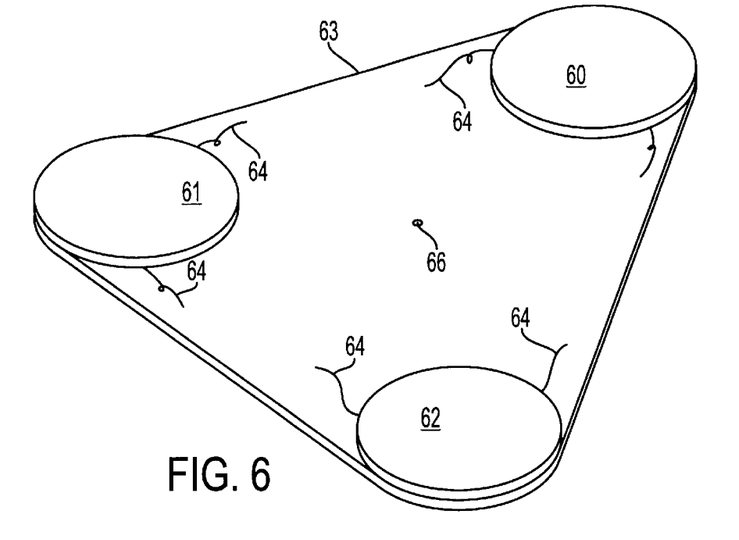
FIG. 6 is an illustration of a suitable sensor arrangement.
Figure 7:
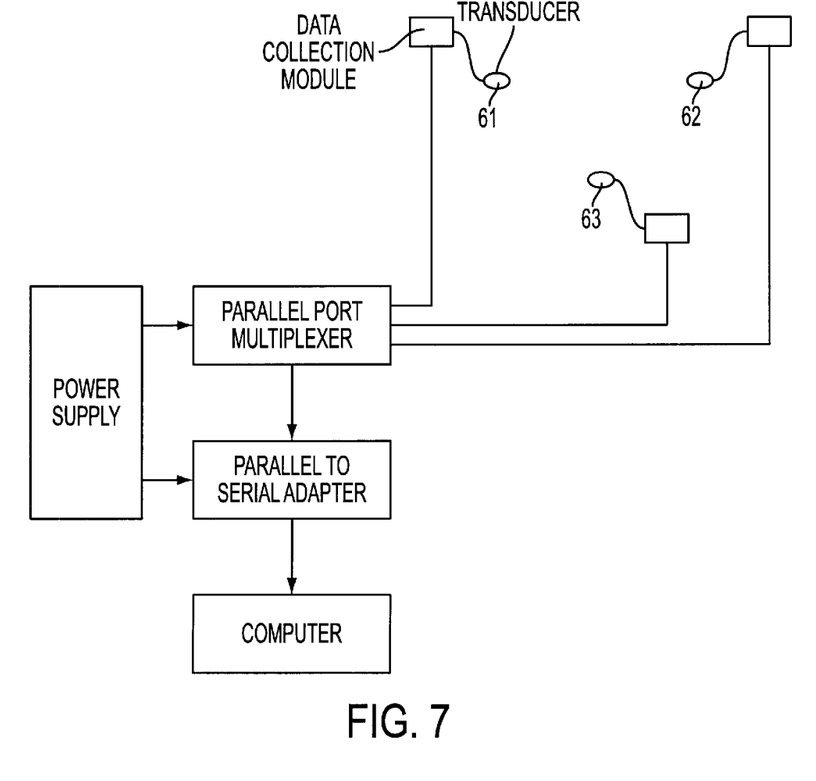
FIG. 7 is an illustration of a suitable apparatus arrangement.

Turning now to FIGS. 6–7, an apparatus that may be used to detect a shock wave of a supersonic projectile will be described. Although the invention is described below in a particular environment, it should be appreciated that the invention can be modified by those skilled in the art to function in different environments, for example, using different types of sensors or using a different number of sensors or sensor elements.

FIG. 6 illustrates a sensor capable of detecting a shock wave. Preferably, at least two such sensors are arranged to encounter the shock wave from the projectile. Each sensor may include a number of sensor elements, for example, transducers. A typical specific embodiment of the preferred sensor is shown in FIG. 6, but the sensor can be of any desired configuration consistent with the requirements, as described above and as explained more fully below. At least two sensors and at least two sensor elements should be used. In the example shown in FIG. 6, each sensor element 60, 61, 62 (three being shown in FIG. 6) is mounted on a support 63 (discussed more fully hereinafter). The sensor elements may be any transducer capable of generating a signal in response to pressure on the transducer created by the shock wave encountering the transducer and are not limited to acoustic transducers. The transducers may generate a light signal, an acoustical tone signal, an electrical signal, or others, but commercially available piezoelectric crystals are quite convenient in this regard. For example, the transducers shown in FIG. 6 can be piezoelectric crystals made by Electro-Ceramics. A wire 64 is soldered to each side of the crystals after the surface of the crystal is prepared with an abrasive material. The polarity of each crystal is noted so that each input to the crystal has the same polarity going to the detection electronics, explained below. A positive voltage output is produced during compression of the crystal by the shock wave. The crystals may be glued to the support 63 with an adhesive, such as a silicone-based adhesive, and, preferably, the support is a conventional shock-absorbent material, e.g. Isodamp. This material should have an acoustical damping property. Each of the transducer crystals is positioned on support 63 in a known geometry. Preferably an equilateral triangle with leg lengths of 3 inches is used, although any known geometry and any length of distances between the crystals may be used. The equilateral triangle, however, simplifies the calculations and for that reason is preferred.

The six wires 64, two from each of the three sensor elements 60, 61 and 62, are inputted to a data collection module as shown in FIG. 7, with one data collection module for each transducer. These modules determine which sensor element has the first hit by a main shock wave, more preferably by the main shock front, which sensor element has a second hit by that shock wave, and the time between the first hit and the second hit, as well as the time between the first hit and the last hit. This information is fed to a computer for making the required calculations, referred to below, by any conventional devices, such as a parallel port multiplexer to a parallel-to-serial adapter, with associated required power supplies, also as shown in FIG. 7. For example, this arrangement can accommodate twelve 8-bit parallel input ports and switch each, in turn, to a single 8-bit output parallel port. The output is fed through a parallel-to-serial adapter to the computer. All of the components of this arrangement, with the exception of the sensors, are commercially available and well known to the art. Hence, no further description thereof is necessary.

Once in the computer, the data is used in calculations to convert that data to azimuthal and elevational information for each transducer of a sensor. These calculations may be performed using software performing the method described in U.S. Pat. No. 5,241,518, which is incorporated herein by reference. In addition, as described above, there should be at least three sensors, and a similar arrangement as described above is used for each sensor. The computer takes the data from each sensor and makes the mathematical calculation, described above, for the azimuth and elevation of the full sighting vector generated from each sensor. For example, in the arrangement shown in FIG. 6, the origin of the vector will be central point 66 of the three transducers, with the full sighting vector of the transducers extending to the projectile trajectory. That calculation, therefore, obtains the position, the azimuth and the elevation of the local trajectory of the projectile, in the vicinity of the sensors, as well as the velocity of the projectile.

Figure 8:
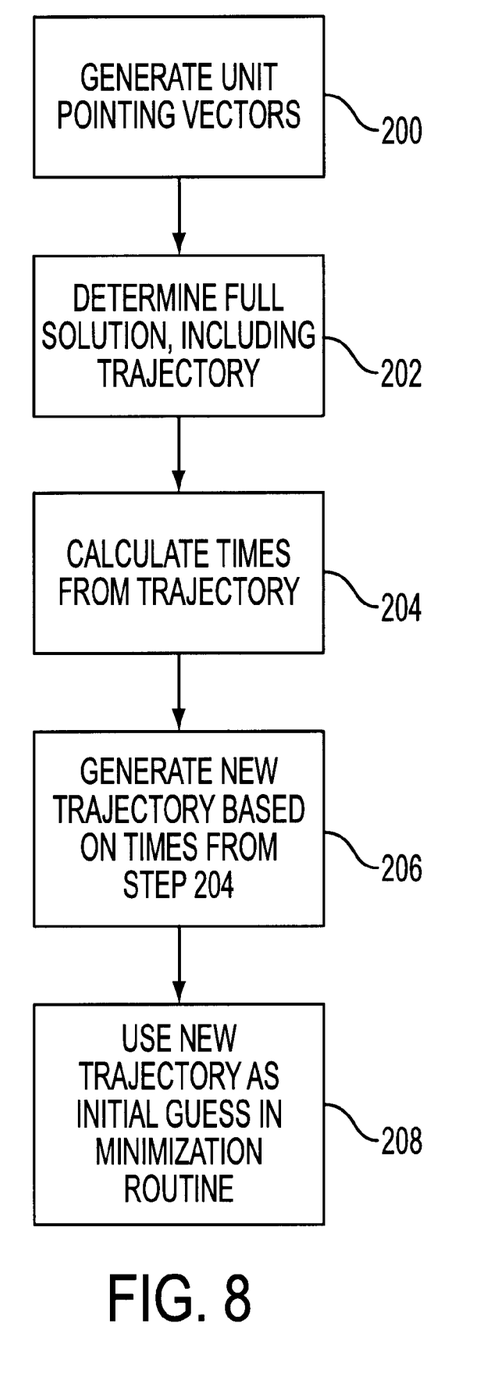
FIG. 8 is a flow diagram of a method for generating an initial guess for the trajectory according to an embodiment of the invention.
Figure 9:
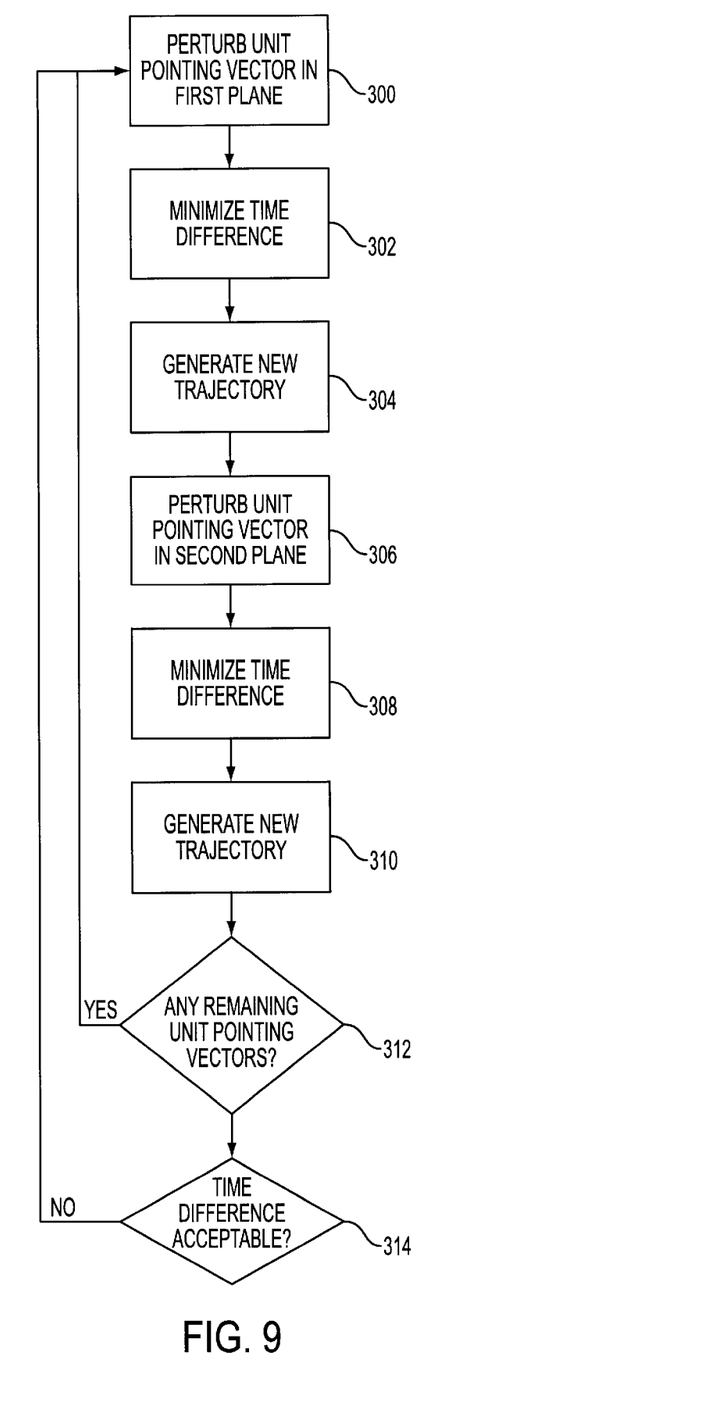
FIG. 9 is an illustration of a flow diagram of a minimization routine according to an embodiment of the invention.

Accordingly, the unit pointing vectors and, from the unit pointing vectors, the full pointing vectors and a trajectory of the projectile can be calculated using a planar approximation of the shock wave. The trajectory determined from the planar approximation should be modified to obtain a more accurate result. FIGS. 8 and 9 are flow diagrams of a method according to an exemplary embodiment of the invention. FIG. 8 relates to a method to provide an initial guess to prime the process of FIG. 9. The computer described above may also be used to perform these methods. Using times detected by the sensors, unit pointing vectors can be calculated in step 200. These unit vectors may be used to calculate a full solution, including full pointing vectors and a first trajectory for the projectile per step 202. Steps 200 and 202 may be performed using a planar approximation for the shock wave, for example, using the method described in U.S. Pat. No. 5,241,518, which is incorporated herein by reference. As mentioned above, the method of that patent may use time differentials between the shock wave encountering different sensor elements. Therefore, these are the times the sensors should be adapted to collect. Based on the first trajectory determined using the planar approximation for the shock wave in steps 200 and 202, times (calculated times) that the shock wave should have arrived at the different sensor elements for a sensor may be calculated, per step 204. The calculated times should be back-calculated, based on a conical geometry for the shock wave, from the first trajectory determined in step 202. The first trajectory is generated based on a planar approximation for the unit vectors. As the calculated times are generated from the first trajectory, but use a conical geometry for the shock wave, the calculated times should differ from the times by measured the sensor.

In an exemplary embodiment, the back-calculation can generate the calculated times for a given trajectory and full pointing vectors. For example, a ray tracing process can be used for the back-calculation. This process assumes a conical shape for the shock wave.

Next, in step 206, a new trajectory may be generated using the calculated times determined in step 204. The new trajectory may be calculated using an equation, such as that described in U.S. Pat. No. 5,241,518, still using a planar approximation. The new trajectory from step 206 may be used as an initial guess to prime the minimization routine, step 208. The minimization routine is described in more detail below in connection with FIG. 9.

Once the initial guess is determined, a more accurate solution can be determined using a minimization routine. The flow chart of FIG. 9 illustrates an example of an iterative minimization routine according to an embodiment of the invention. One of the unit pointing vectors of the initial guess may be selected as a starting point. Any of the unit pointing vectors used to generate the initial guess may be used and the unit pointing vector selected is referred to herein as the first unit pointing vector. According to step 300, the first unit pointing vector may be perturbed in a first plane. Selection of the plane should be done carefully as it can affect the number of iterations required to reach an accurate result. As discussed above, a fast convergence can be achieved if the unit vector is first perturbed in a plane containing a gradient calculated from the initial guess or the previous iteration. While perturbing the first unit pointing vector, a difference between the measured times and the calculated times for the sensor corresponding to the first unit pointing vector should be minimized, per step 302. The minimization may be performed based on well-known methods, such as Brents Polynomial Interpolation Method or any other minimization method.

Next in step 304, the new first unit pointing vector from steps 300 and 302 and the latest values for the other unit pointing vectors that are not being perturbed may be used to generate a new full solution for the projectile, including full pointing vectors and a trajectory.

In step 306, the perturbation process may be repeated for the same first unit pointing vector as in step 300. However, here, the first unit pointing vector may be perturbed in a second plane that is perpendicular to the first plane. Again, while perturbing the first unit pointing vector in the second plane, a difference between the measured times and the calculated times for the sensor corresponding to the first unit pointing vector should be minimized, per step 308.

According to an exemplary embodiment, simply moving the unit pointing vector a minute amount in the desired plane can perform perturbation. For example, the unit pointing vector can be rotated a few degrees in the plane. The effect of the rotation on the difference between the measured times and the calculated time is determined. The rotation is carried out until the difference between the times is minimized.

Turning now to step 310, another full solution may then be generated using the latest unit pointing vectors, including the unit pointing vector generated in steps 306 and 308, to update the lengths of the unit pointing vectors, resulting in new full pointing vectors, and to get a new trajectory. Using the trajectory from step 310, calculated times that the sensor should have detected based on that trajectory may be back-calculated. This calculation should be performed using a conical geometry for the shock wave and may be carried out using the back-calculation process described above with regard to FIG. 8. The calculated times can be compared to the actual times measured for the sensor. The perturbation process may be repeated for the other unit pointing vectors and the first unit pointing vector again until an acceptable time difference is obtained, per step 312. If the difference between the times is within an acceptable range, the process may be stopped per step 314. Alternatively, the process may be repeated for a selected number of repetitions or for a specified period of time.

Accordingly, a method and system for determining the trajectory of a projectile is provided. The system and method can correct for the planar approximation of the shock wave and generate an accurate trajectory for the projectile. Therefore, the source of the projectile can be more accurately determined based on this trajectory.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described. For example, other means of detecting the pressure wave may be used, since, quite obviously, it is not the particular means, but the determination of parameters by those means which is important. Also, although the invention is described in detail above with regard to measuring a shock wave, the invention can be used in conjunction with other pressure waves, such as blast waves.

I claim:

1. A method for determining the trajectory of a projectile, comprising:
   a) detecting a shock wave created by the projectile with a number of sensors;
   b) measuring times that the sensors encounter the shock wave;
   c) generating unit pointing vectors based on the measured times;
   d) determining a first trajectory for the projectile based on the unit pointing vectors;
   e) perturbing at least one of the unit pointing vectors;
   f) generating a second trajectory based on the perturbed unit pointing vector and the remaining unit pointing vectors;
   g) determining calculated times based on the second trajectory;
   f) determining a difference between the measured timed with the calculated times;
   g) determining if the difference between the times is within an acceptable range; and
   h) if the difference is outside the acceptable range, repeating steps e)–h), otherwise locating a source of the projectile based on the second trajectory.

2. The method of claim 1, wherein step c) is performed based on a planar approximation for the shock wave.

3. The method of claim 1, wherein step g) is performed based on a conical shock wave.

4. The method of claim 1, wherein the unit pointing vector is perturbed in two planes.

5. The method of claim 4, wherein the two planes are perpendicular to each other.

6. The method of claim 1, further comprising minimizing the difference between the measured times and the calculated times while perturbing the unit pointing vector.

7. A method of determining a trajectory of a projectile, comprising:
   measuring parameters of a pressure wave;
   determining unit pointing vectors based on the measured parameters;
   determining a trajectory based on the unit pointing vectors;
   generating calculated parameters based on the trajectory;
   perturbing unit pointing vectors to minimize difference between the measured parameters and the calculated parameters; and
   determining a new trajectory based on perturbed unit pointing vectors.

8. A method of calculating a trajectory of a supersonic projectile, comprising:
   a) providing a plurality of sensors capable of detecting a shock wave generated by the projectile;
   b) generating signals with the sensors when the shock wave is detected, the signal indicating times when the shock wave is detected by elements of the sensors;
   c) calculating a unit vector for each sensor based on the signal;
   d) determining an initial trajectory for the projectile based on the unit vectors;
   e) calculating times the shock wave should have been detected at the elements of the sensors based on the initial trajectory;
   f) determining a time difference between the measured times and the calculated times;
   g) perturbing the unit vector in a first plane based on the time difference to minimize the time difference for that unit vector;
   h) determining a second trajectory based on the latest values for the unit vectors;
   i) recalculating the calculated times based on the second trajectory; and
   j) repeating steps g)–i) until the time difference is within an acceptable range or a predetermined number of iterations has been performed.

9. The method of claim 8, further comprising perturbing the unit vector in a second plane perpendicular to the first plane.

10. The method of claim 8, wherein time difference is minimized using a polynomial interpolation method.

11. The method of claim 8, wherein initial trajectory is calculated using a planar geometry for the shock wave.

12. The method of claim 8, wherein step i) is performed using a conical geometry for the shock wave.

13. The method of claim 8, wherein the initial trajectory is determined based on the calculated times of step e).

14. The method of claim 8, wherein the first plane is based on a gradient of the initial trajectory.

15. A method for determining a trajectory of a projectile, comprising:
   a) providing at least first and second sensors capable of encountering a shock wave generated by a supersonic projectile;
   b) measuring times the shock wave is encountered by the sensors;
   c) calculating a unit vector for each sensor based on measured times;
   d) calculating a full solution including a first trajectory and full unit vectors based on the unit vectors and assuming a planar geometry for the shock wave;
   e) determining calculated times based on the first trajectory, the unit vectors and assuming a conical geometry for the shock wave;
   f) determining a time difference between the measured times and the calculated times;

g) based on the time difference, determining a first guess as to the trajectory;

h) perturbing a first unit vector in a first plane while minimizing the time difference;

i) calculating a full solution based on the perturbed first unit vector and the other unit vectors;

j) perturbing the first unit vector in a second plane perpendicular to the first plane, while minimizing the time difference;

k) calculating a full solution based on the perturbed first unit vector and the other unit vectors; and l) repeating steps h)–k) for the remaining unit vectors.

16. The method of claim 15, further comprising repeating steps h)–l) until a predetermined time difference is obtained.

17. The method of claim 15, further comprising repeating steps h)–l) for a predetermined period of time.

18. The method of claim 15, further comprising repeating steps h)–l) for a predetermined number of iterations.

19. The method of claim 15, wherein the first plane contains a gradient calculated from the first guess.

20. An apparatus for determining a trajectory of a projectile, comprising:
at least two spaced apart sensors capable of encountering a shock wave generated by a supersonic projectile and capable of generating signals in response to the shock wave, the signals being related to an azimuth and elevation angle of a unit pointing vector;

means for calculating from the signals the unit pointing vectors for each of the sensors;

means for calculating a first trajectory of the projectile based on the unit pointing vectors; and means for back-calculating times from the first trajectory based on a conical geometry of the shock wave.

21. A computer useable information storage medium storing computer readable program code means for causing a computer to perform the steps of:

generating unit pointing vectors based on the measured times;

determining a first trajectory for the projectile based on the unit pointing vectors;

perturbing at least one of the unit pointing vectors;

generating a second trajectory based on the perturbed unit pointing vector and the remaining unit pointing vectors;

determining calculated times based on the second trajectory;

determining a difference between the measured times with the calculated times;

determining if the difference between the times is within an acceptable range; and if the difference is outside the acceptable range, repeating steps of the process, otherwise locating a source of the projectile based on the second trajectory.

* * * * *